United States Patent [19]

Ost

[11] Patent Number: 4,540,276

[45] Date of Patent: Sep. 10, 1985

[54] COLOR PHOTOGRAPHIC REPRODUCTION SYSTEM

[76] Inventor: Clarence S. Ost, 7905 Bayshore Dr., Margate City, N.J. 08402

[21] Appl. No.: 537,702

[22] Filed: Sep. 30, 1983

Related U.S. Application Data

[63] Continuation-in-part of Ser. No. 363,070, Mar. 29, 1982.

[51] Int. Cl.$^3$ .............................................. G03B 27/80
[52] U.S. Cl. ......................................... 355/38; 355/71
[58] Field of Search ....................... 355/32, 38, 68, 71

[56] References Cited

U.S. PATENT DOCUMENTS

| 3,542,470 | 11/1970 | Ost ..................................... 355/71 X |
| 4,101,216 | 7/1978 | Grossmann ............................. 355/38 |
| 4,464,045 | 8/1984 | Findeis et al. ......................... 355/38 |
| 4,492,458 | 1/1985 | Bickl et al. ............................. 355/38 |

*Primary Examiner*—Richard A. Wintercorn
*Attorney, Agent, or Firm*—Charles A. McClure

[57] ABSTRACT

Color photo-reproduction of copy is assured by measuring and storing optical densities of the copy plus calibration data for densitometric equipment used in such measurement, as well as values of other pertinent parameters. This system involves interaction between a human operator and an inanimate assistant commonly recognized as a computer. The operator does such acts as juxtaposing a densitometric component of the system to parts of the copy, to density standards, and to trial reproductions so as to input density data retrievably to the computer memory. The operator also may supply, either by measurement or specification, actinic, chromatic, dimensional, and other relevant data. The computer displays, for the guidance of the operator, various announcements, inquiries, and instructions, as well as empirical and calculated values of data. The information variously supplied is processed by the computer according to appropriate procedures and computational rules. The methods of color photo-reproduction include producing color-corrected continuous tone masks and both indirect-screen and direct-screen color-separation negatives.

25 Claims, 12 Drawing Figures

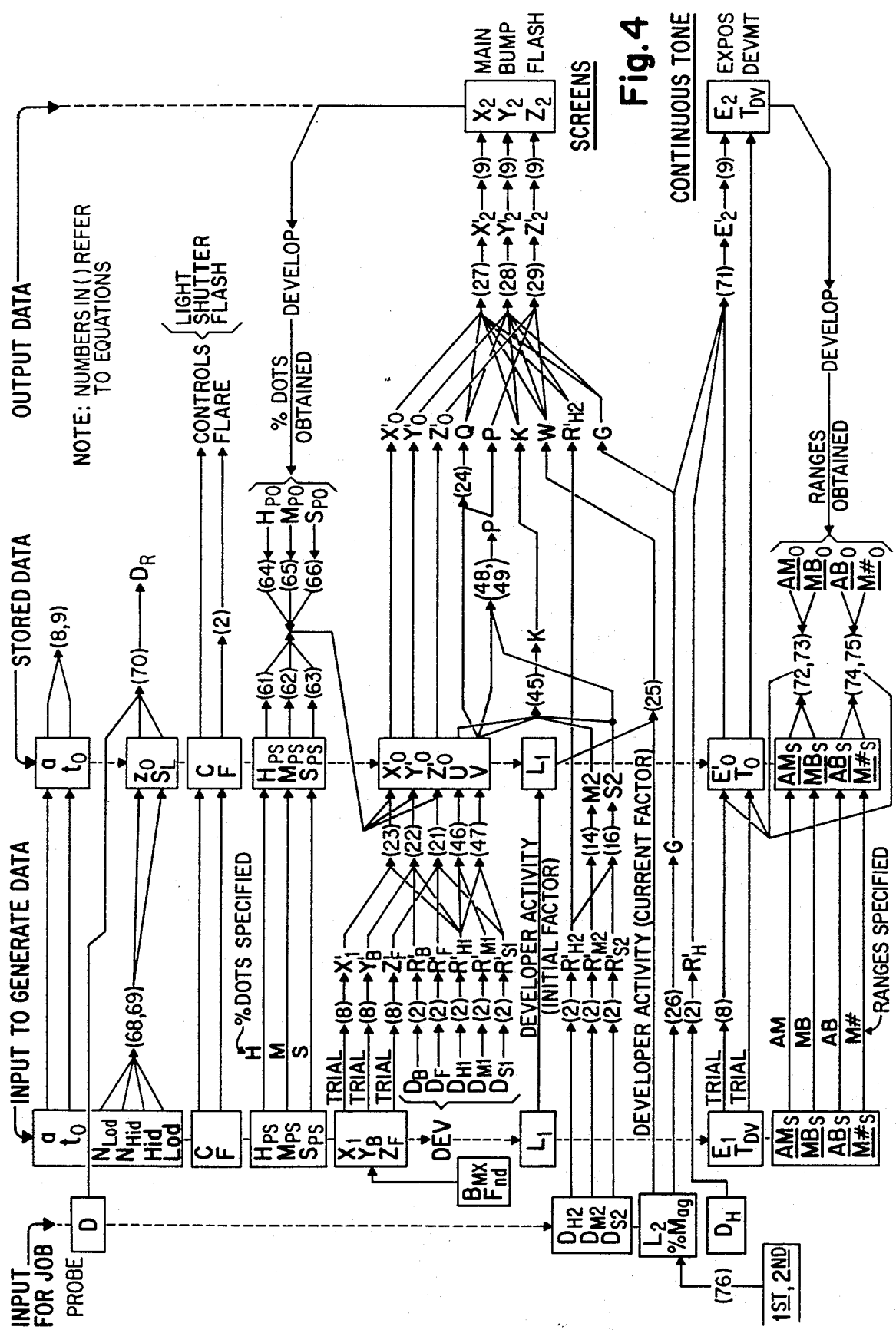

COLOR PHOTOGRAPHIC REPRODUCTION SYSTEM

This is a continuation-in-part of my copending application for Photographic Reproduction System, Ser. No. 363,070, filed Mar. 29, 1982.

This invention relates to accomplishing well controlled high-quality photographic reproduction, not only in black-and-white but also in color, and is especially useful in graphic arts techniques wherein a screen is utilized with the copy to be reproduced, thus imposing special requirements upon exposure determination, etc.

As is well known, in commercial reproduction of photographs, intermediate tones commonly are produced through application of ink or the like in a discontinuous pattern of dots, covering most of the available area for dense tones and less for lighter tones. This dot-like coverage is accomplished by using one or more half-tone or vignetting screens, but such a screen limits the tonal range that can be reproduced from continuous-tone copy. "Copy" is anything to be reproduced, which need not be a copy of something else. "Screen range" is the difference to optical density between the respective areas of the copy conductive to reproduction of an optimum highlight dot and an optimum shadow dot when exposed for a basic copy exposure.

If the tonal range of the copy to be photographed—which may be called the "copy range"—exceeds the screen range, as is usual, tones will be lost in the lightest portion or the darkest portion (or both), at least whenever only a single exposure is made. If the screen range exceeds the copy range, the copy will reproduce "as is" rather than being stretched over the screen range.

Techniques are known to compensate for such discrepancies between copy range and screen range of tone or optical density by making more than one exposure (superimposed on one another) and carefully calculating and controlling the light flux at each of the exposures. My aforementioned copending application and my U.S. Pat. No. 3,542,470 and British Pat. No. 1,286,603 teach such techniques, including main, bump, and flash exposures, and their availability is assumed here. Similarly, high key copy and low key copy can be accommodated by shifting a preferred midtone dot toward the highlight end or the shadow end, respectively, so as to enhance either highlight or shadow detail. No-screen reproduction can be improved somewhat similarly by manipulating exposure and development times.

Mathematical explanations of many such matters are set forth by H. Brent Archer in two papers available as reports of the Information Service of the Rochester Institute of Technology Graphics Arts Research Center: no. 158, entitled "Calculation of Multiple Halftone Exposure Time for Three Point Control" (May 1977); and no. 162, entitled "New Information on the Calculation of Multiple Halftone Exposure Times" (May 1980). The contents of these papers are incorporated herein in their entirety by this reference. An understanding of the present invention will be facilitated by scrutiny of the Archer papers, notwithstanding that in certain respects (apparent below) this invention extends beyond or departs somewhat from his valuable teachings. For convenience, the present specification adopts the Archer notation or symbology for the most part, modified and supplemented in tables below.

A primary object of this invention is a novel systematic procedure for obtaining and storing pertinent density data and related information to be retrieved and used for controlling photographic reproduction.

Another object of this invention is provision of interactive computer-assisted photographic reproduction in which participation of a normally competent human operator assures excellent quality.

A further object of the invention is coached self-instruction of operations in determining and effecting control of photographic reproduction.

A specific object is exposure compensation for deviation, of developer and image medium characteristics affecting reproduction, from specified values in a light-integrating member of halftone photographic exposure.

Yet another object is control of midtone density, as well as highlight and shadow, in halftone screened and in unscreened continuous tone photographic reproduction.

A still further object is utilization of such methods of controlled photographic reproduction for copy in color, as well as in black and white.

A complementary object is provision of apparatus useful in accomplishing the foregoing objects.

Other objects of the present invention, together with means and methods for attaining the various objects, will be apparent from the following description and the accompanying diagrams, which feature a preferred embodiment of the invention by way of example rather than limitation.

Figure 1:
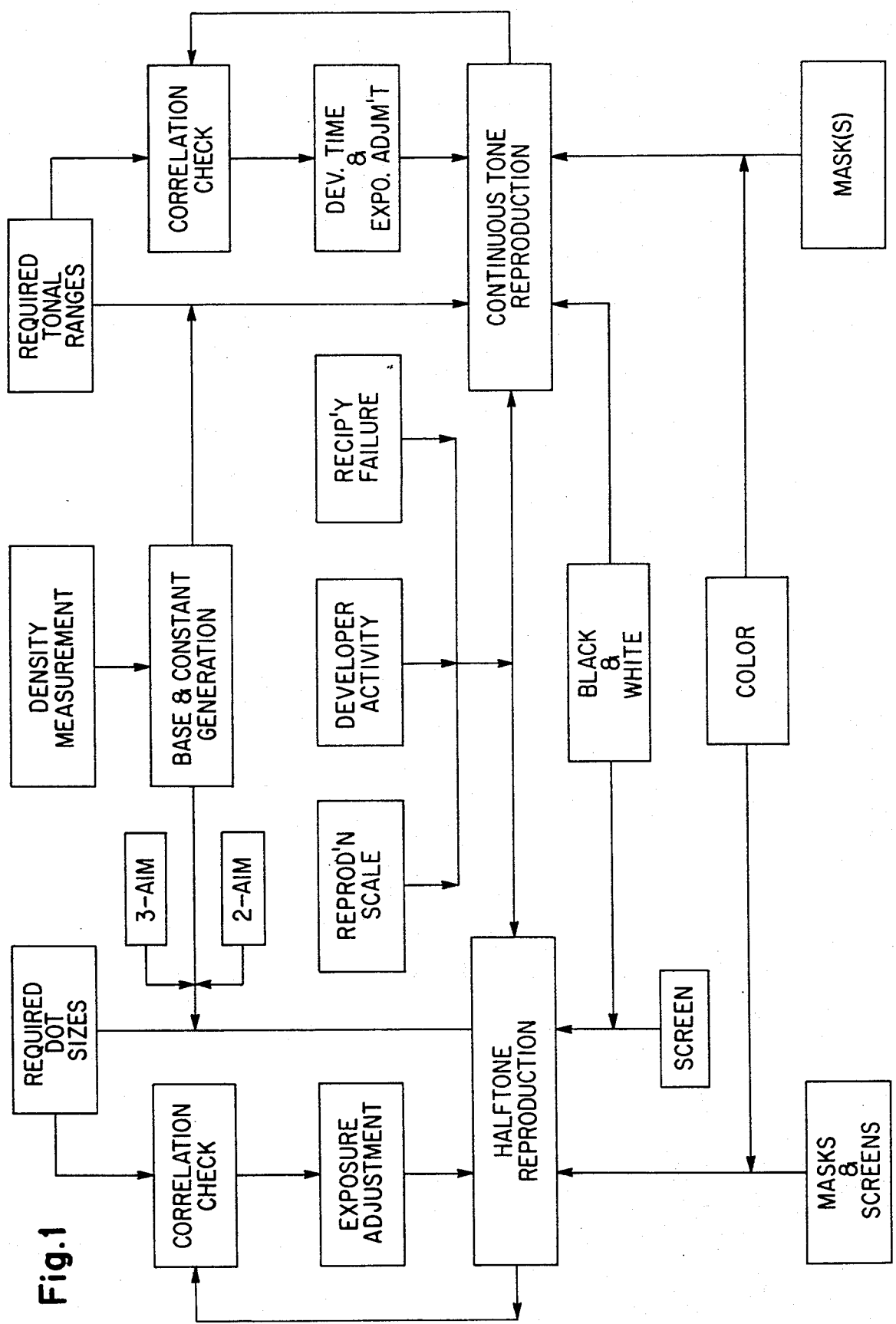
FIG. 1 is a diagrammatic layout of procedural components of, or useful in relation to, the present invention.

FIGS. 3A to 3E comprises an interrelated set of schematic flow charts illustrating numerous decisions (in diamonds) and other steps (in rectangles) performed by human operator (solid outline) or otherwise (dashed outline) as by computer or related apparatus in practice of this invention;

FIG. 4 is a schematic flow sheet for computational steps, here conveniently machine-assisted or performed by computer; and FIGS. 5A to 5D constitute a set of displays to the operator, as on a CRT, during the practice of this invention, including the following: announcements, inquiries, and instructions; numerical results of measurements, manufacturer's or operator's data, or calculations utilizing the foregoing; also tabular and graphical representations of such data, measurements, or calculations.

In general, the objects of the present invention are attained in a densitometrically determined light-integrating system of photographic control, by interaction between a human operator and inanimate means adapted to store, process, and display pertinent information and also adapted to interrogate and to instruct or coach the operator. The invention reaches its highest levels in color reproduction by such means and methods, for which operation in black and white is a precursor or inherent stage of practice.

For no-screen work in black and white, given activity and sensitivity data for the developer and for the film or paper, the steps include measuring, recording, and displaying optical density and corresponding percentage of light transmission or reflection at a succession of locations on a standard grey scale, preferably progressing from light to dark; making a test exposure of such standard copy for a trial number of light units, and developing it for a trial number of seconds; measuring resulting density, and calculating percentage value of light transmission or reflection (in the developed negative or positive, as the case may be), of desired highlight, midtone, and shadow portions thereof; and then comparing the resulting values with the desired values. Finally, upon adjustment or exposure light units and development time, new values can be attained equal to the desired values, whereupon non-standard copy whose highlight control density has been factored in initially is successfully reproducible within an acceptable range of tolerance. Color work is similar but involves repetition for one or more color correction masks, as detailed further below.

Similarly, for halftone screen work, the steps include making a test main (screened) exposure of the standard for a trial number of light units, making a second test exposure of the standard the same as the first test plus a "bump" (i.e., no-screen) exposure of the copy for a prescribed number of light units, and making a third test exposure of the standard the same as the first plus a "flash" (i.e., screened, no-copy) exposure for a trial number of light units, then after developing the three exposed test strips, locating desired percentage highlight, midtone, and shadow dot values in resulting portions of the first strip, the desired highlight value in the second strip, and the desired shadow value in the third strip, measuring the corresponding densities that produced the desired dot values, and calculating main, bump, and flash base exposures, as well as midscreen and full screen ranges. Subsequent fine tuning adjustments can be made in the stated base exposures and/or ranges depending upon the results received.

Doing color separations requires repetition of the screened exposure calculations and procedure for each of the three color components (cyan, magenta, and yellow) and for black. Color correcting masks resulting from individual processing are utilized together with the copy, as is customary, in completing the color separations, either screened (direct method) on continuous tone (indirect method).

It should be understood that, in proceeding according to the foregoing recitals of this invention, the operator is coached or instructed visually and that results of what the operator does are displayed to the operator either immediately or upon completion of intervening calculations machine-assisted by what may be a general purpose digital computer duly programmed beforehand to do so. It would be unduly repetitive to state both an instruction and an action taken pursuant to such instruction, so only the action need be stated, and the instruction be understood as being displayed theretofore. Similarly, where appropriate, the results of the actions taken (e.g., densitometer reading) are to be understood as being displayed immediately thereafter and as being recallable subsequently upon demand.

FIG. 1 shows diagrammatically procedural interrelationships necessarily or likely to be encountered in the practice of this invention. Centered in the upper right part of the drawing are the fundamental procedures of density measurement and of base and constant generation, which affect most of the other procedures. In general, the left half of the diagram relates to halftone, and the right half to continuous tone, photo-reproduction.

Various components or steps shown in FIG. 1 contribute to the respective types of procedure, or to both types, as indicated by arrowheads on the interconnecting lines. Thus, compensation for changes in reproduction scale or in developer activity and for reciprocity failure (non-linearity of actinic effect relative to exposure duration) are applicable to both halftone and continuous tone operations.

While either screened or unscreened procedures may apply to both color and black-and-white reproduction, color work requires making one or more contrast-reducing and color-correcting masks (themselves in continuous tone) to be used to modify the copy characteristics when making cyan, magenta, and yellow, as well as black, continuous indirect separations or corresponding direct screen separations. Only a single screen is required for black-and-white work.

Halftone reproduction is characterized by certain required dot sizes and may be accomplished either by 2-aim (i.e., highlight and shadow) or by 3-aim (highlight, midtone, and shadow) methods. Fine-tuning adjustment of resulting halftone reproduction can be accomplished by checking the degree of correlation between first-trial reproduction results and such requirements, and by modifying appropriately the base exposures (main, bump, and flash) and/or the screen ranges. In continuous tone work, on the other hand, tonal ranges only are prescribed, and both exposure (main only) and development times are adjusted in fine-tuning the results.

Figure 2:
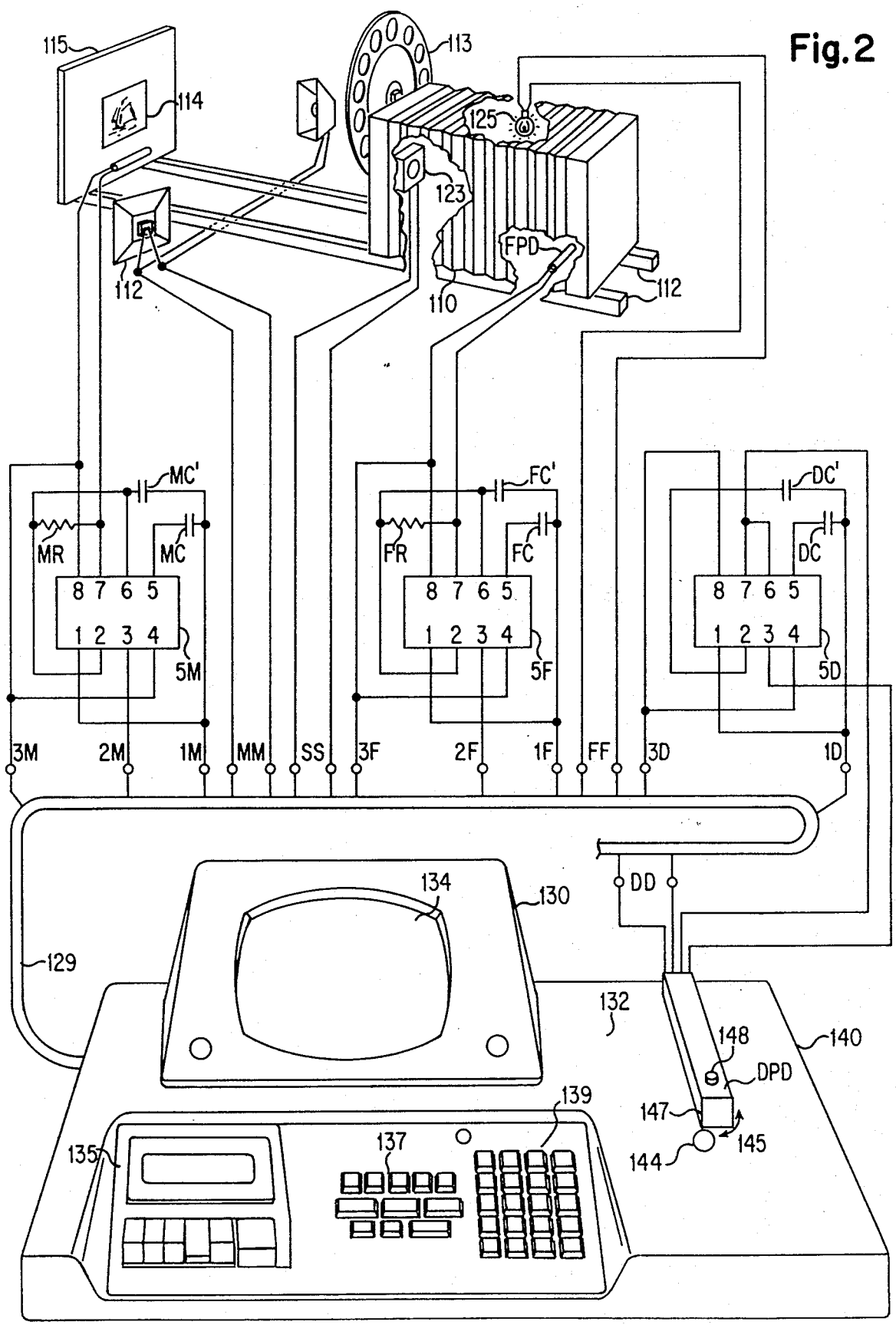
FIG. 2 is a schematic diagram of apparatus used in the practice of this invention.

FIG. 2 shows schematically camera 110 (extensible bellows) mounted slidably on pair of rails 112 on the far end of which is mounted easel 115 carrying pictorial copy 114. Filter wheel 113, whose positioning is controlled by connection with the computer, carries those filters chosen by the operator to produce the masks and the cyan, magenta, yellow, and black separations. Used as described above, it is interposed between the lens and the copy. The easel is illuminated by pair of main lamps 120 in reflectors; it also supports photodiode PD close to the copy. A pair of leads from the photodiode go to terminals 7 and 8 of integrated circuit chip 5M surrounded by circuitry marked MAIN, being one of three like circuits (the other two being marked FLASH and DENSITOMETER) discussed further below. Another pair of leads connects the main lamps to power terminals MM at cable 129. Shown inside the camera (cut away) is shutter 123 with pair of leads to terminals SS to control admission of light (from lamps 112) reflected by the copy. Also similarly shown are flash lamp 125, with pair of leads to terminals FF, and photodiode FPD with pair of leads to terminals 7 and 8 of chip 5F. Not shown is a vignetting screen, which is supported (when used) at essentially the focal plane immediately ahead of the film (also not shown).

Cable 129 in FIG. 2 bundles the various leads and conducts them to general purpose digital computer 130, which is shown as comprising (in addition to conventional circuitry, not shown) housing 132, cathode-ray tube (CRT) 134 carried thereon, cassette player 135 (and conventional controls) at the left of a keyboard having key group 137 in the center and key group 139 at the right. At the right of the computer is found densitometer 140 comprising stage 142 with field illumination opening 144 therein, supporting densitometer arm 145 (carrying manual button 148), which is hinged for movement up and down (as suggested by a two-headed arrow) and is biased in the up position. The arm has inside its free end photodiode DPD (indicated) and diode lamp (DL, not indicated) with pairs of leads to respective pairs of terminals DD and 7,8 of 5D.

Each of integrated circuit chips 5M and 5F is of 555 type and is connected as a monostable charge-discharge device whose flip-flop periodicity is determined by its RC time constant, the C (or capacitance) being fixed by the principal capacitor (MC or FC) and the R (or resistance) being that of the corresponding photodiode (PD or FPD). Each repetition or flip of the monostable flip-flop actuates interative counter-relay means (not separately shown) in the computer, decrementing its count—from a preset value, which corresponds to the desired number of exposure units—as long as light is incident onto the corresponding photodiode, and to zero. The associated relay contacts complete the energizing circuit (not shown) to the illumination means through contact pairs MM or FF until the counter reaches zero from the predetermined count and then open to deenergize the relay.

Figure 3A:
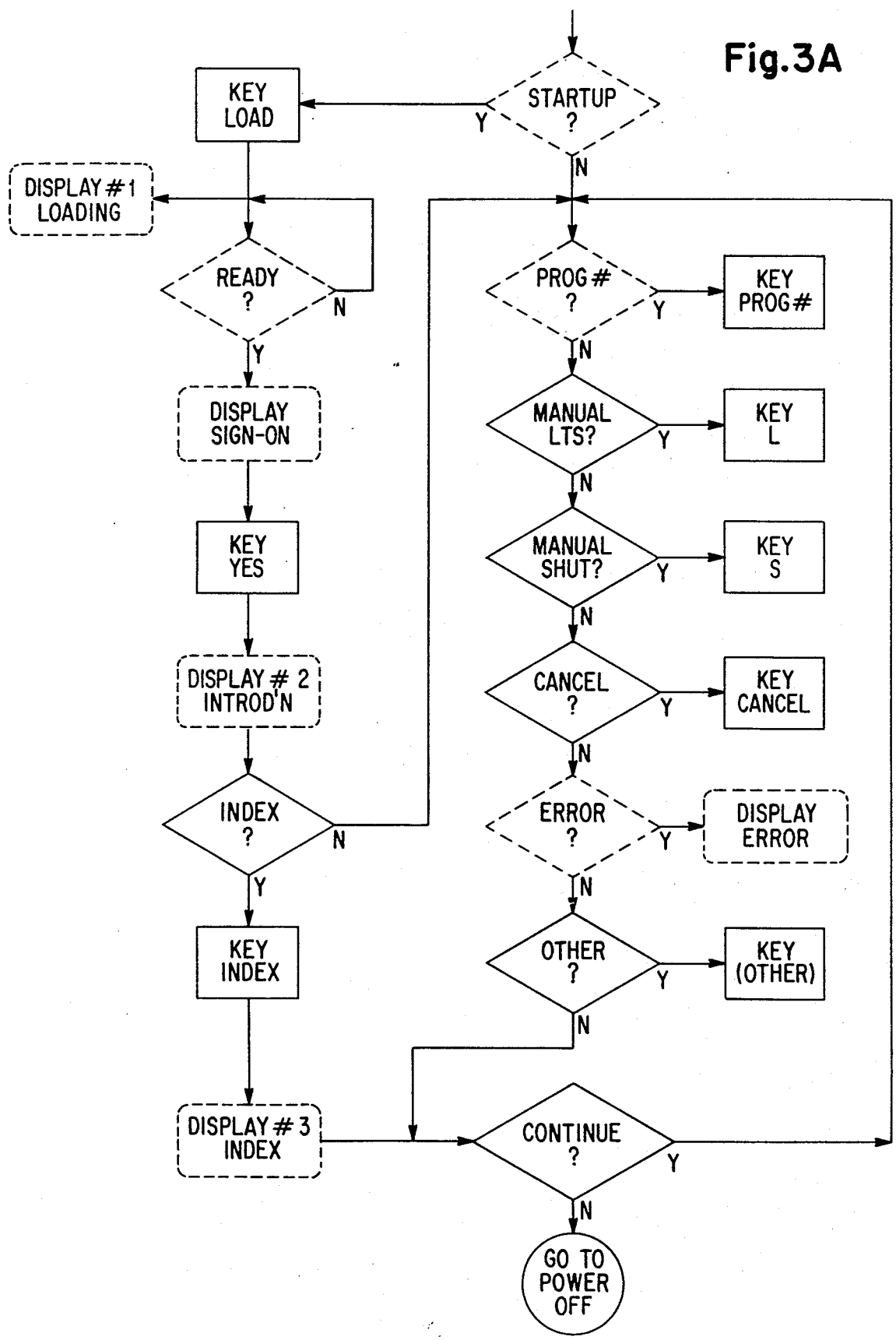
Figure 3B:
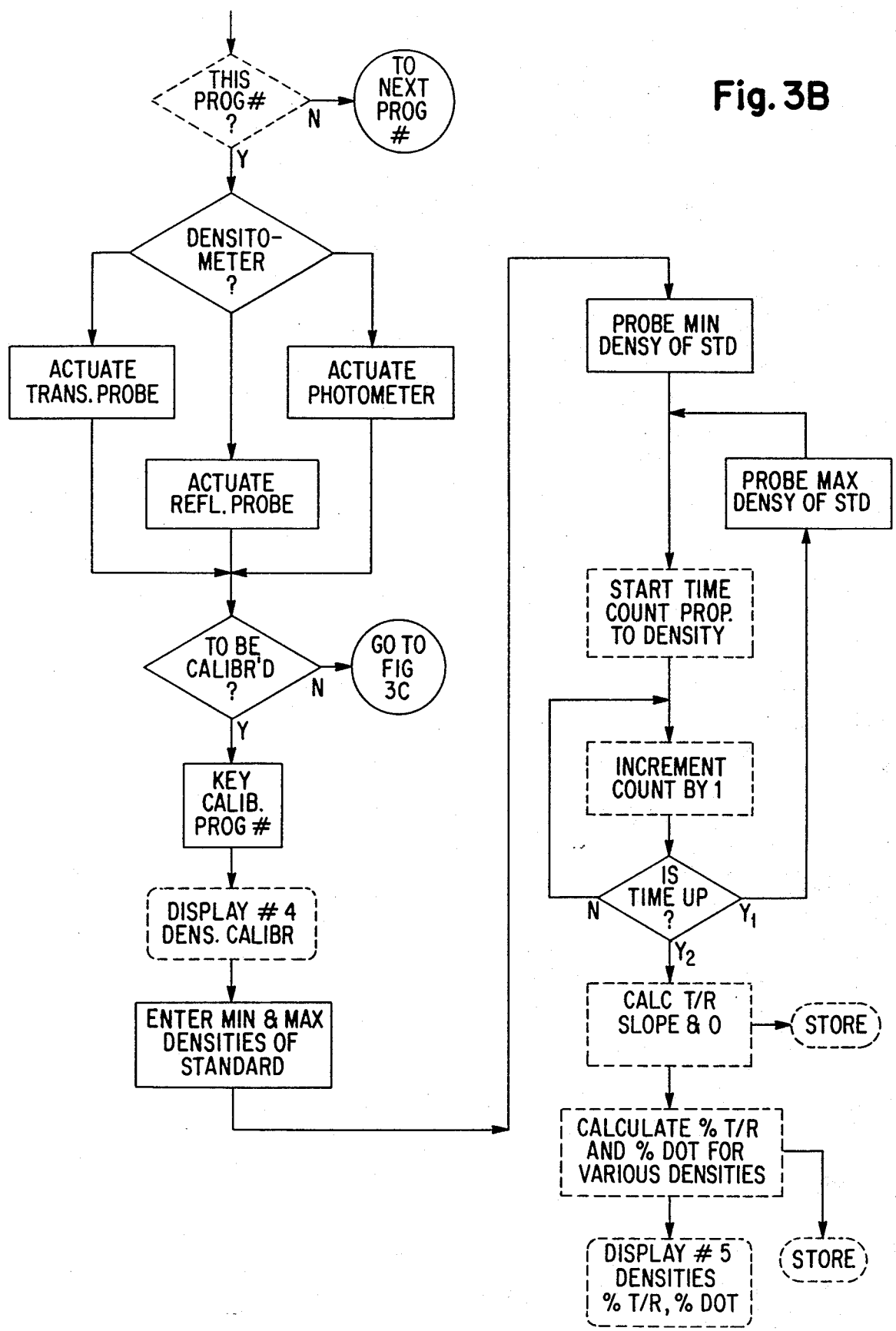
Figure 3C:
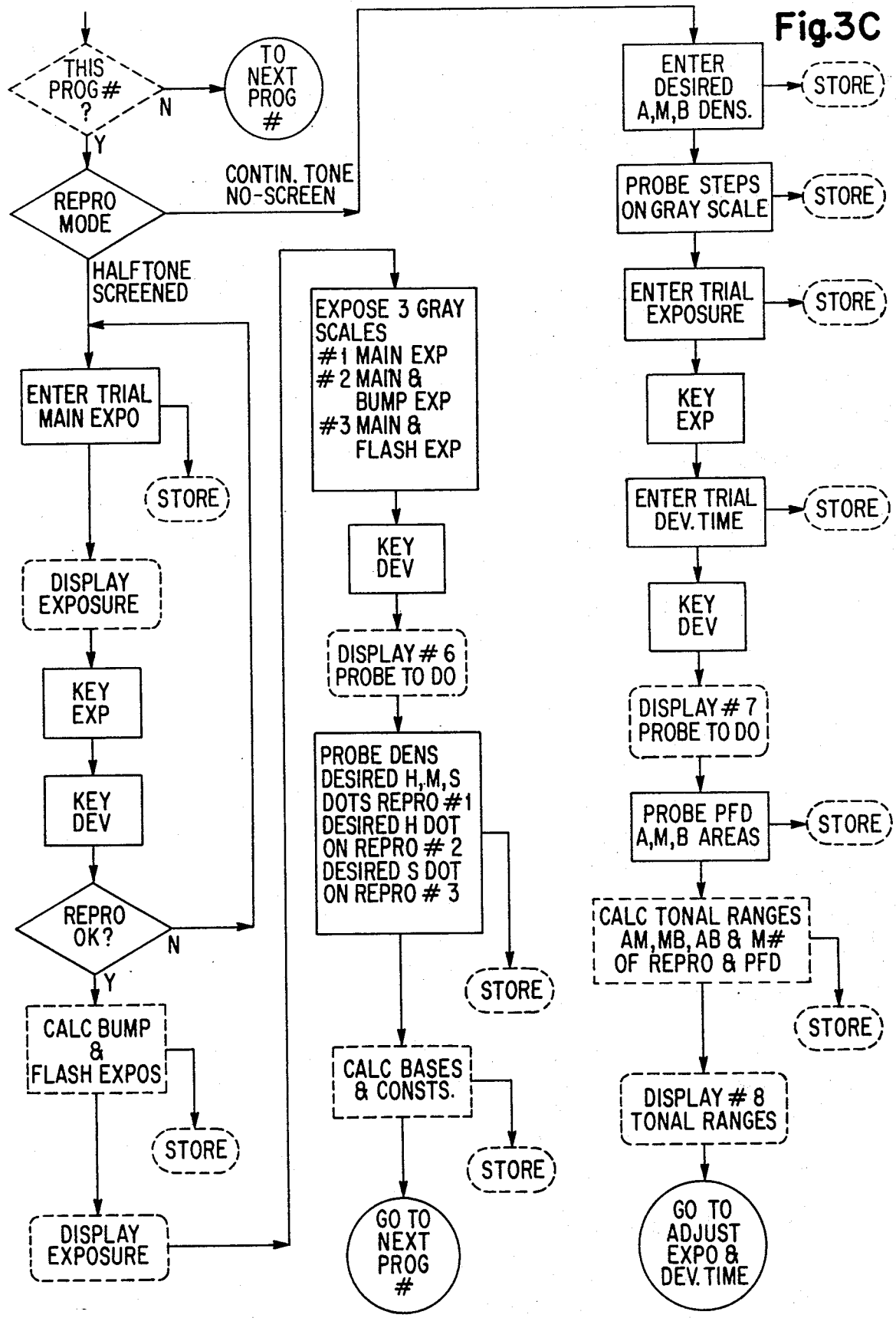
Figure 3D:
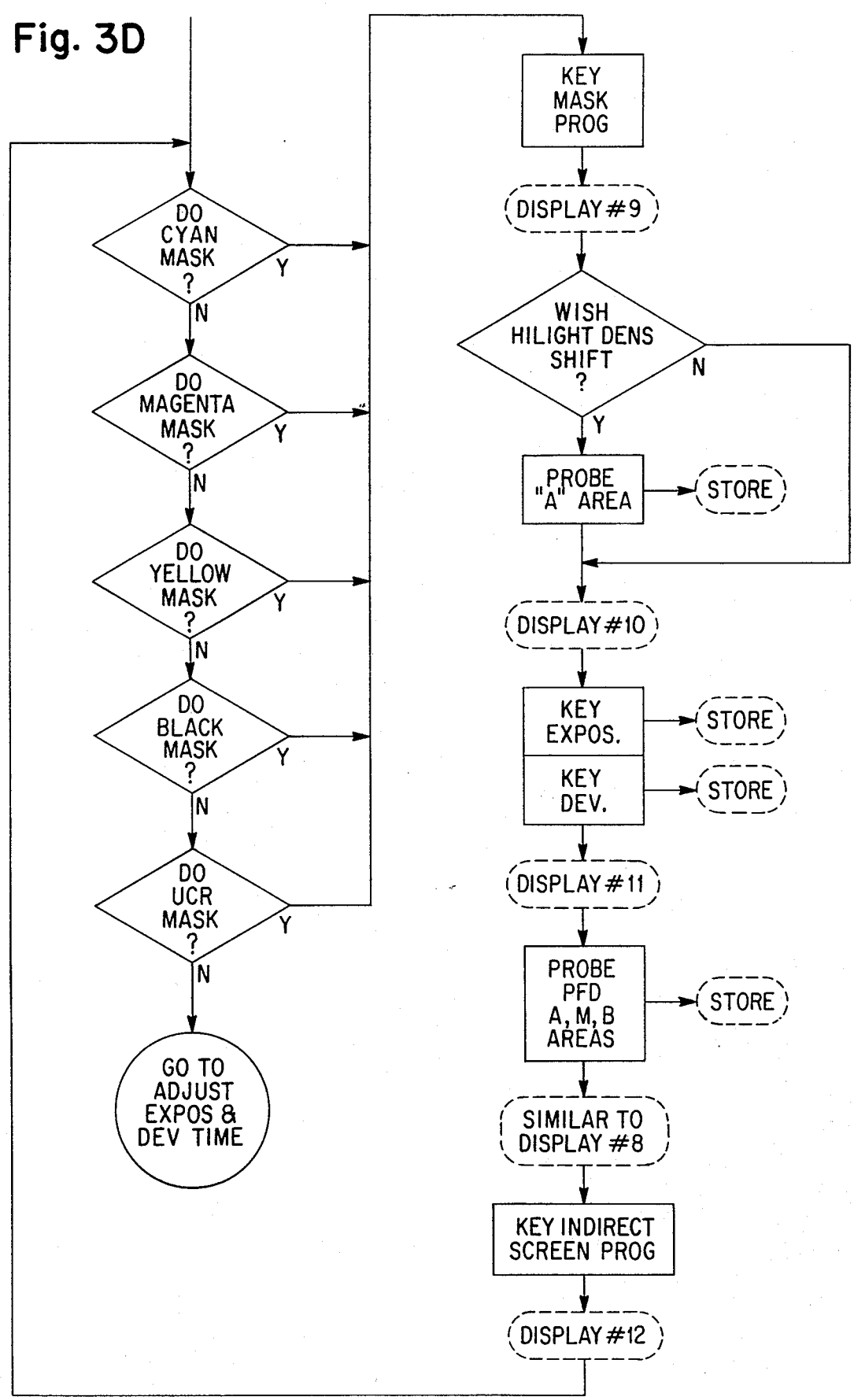
Figure 3E:
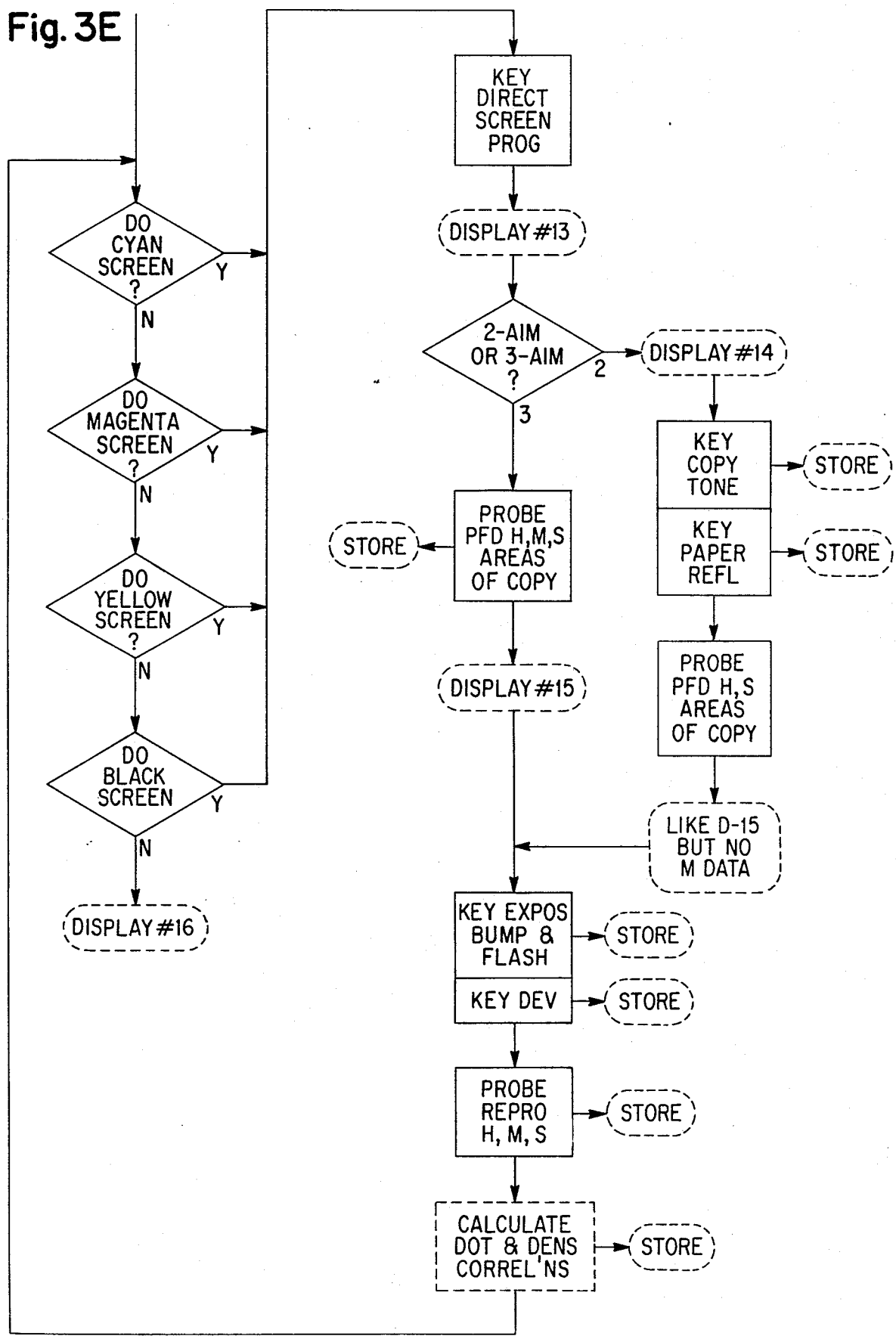
Figure 5A:
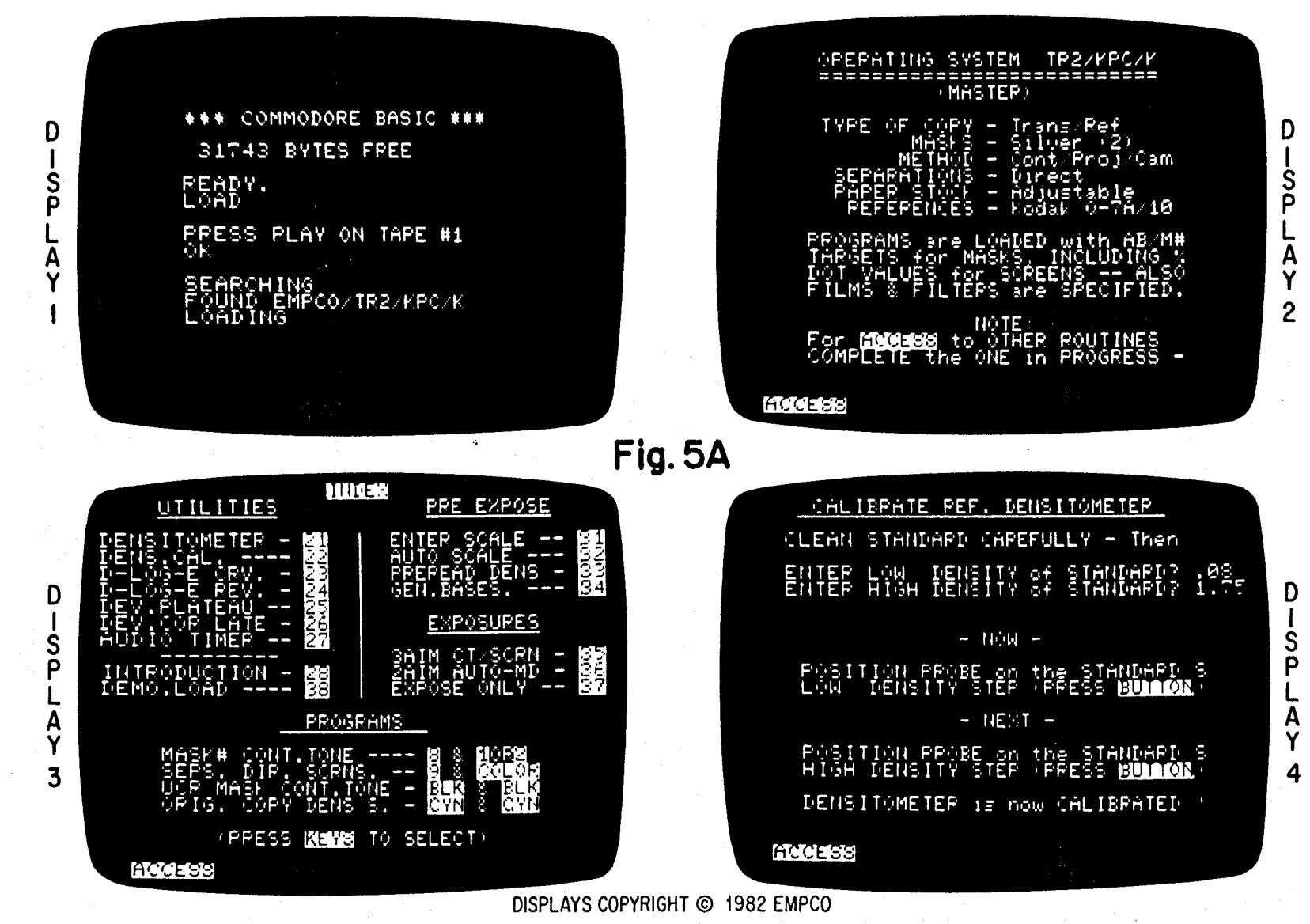

FIGS. 3A and 3E show, in flow-chart form, procedures utilized in the practice of this invention. FIG. 3A shows a startup path. A diamond captioned STARTUP? represents a decision point for the operator; if the answer is Y (yes) the operator should key LOAD, whereupon the software program will be loaded into the computer memory from the cassette tape, and Display #1. (v. FIG. 5A) will appear until a READY? decision is affirmed by the computer—and a title or sign-on display (not shown) will appear. Then the operator should follow on down the left-hand side of the diagram, next keying YES to continue, whereupon an introduction DISPLAY #2 appears (also in FIG. 5A). At this point a beginning operator may choose to see as index by keying INDEX, whereupon DISPLAY #3 will appear. The operator may select a program number by keying an appropriate number shown in the index (possibly from memory). The same choice are available if not a start-up; or the operator may make other choices (right-hand column), such as manual light or shutter operation, data manipulation, or even to discontinue the session.

FIG. 3B shows one program in detail: DENSITOMETER. After the computer determines whether this program's number has been selected, the operator first selects a specific mode of density measurement: TRANSMISSION, REFLECTION, or PHOTOMETER; and then must activate the corresponding piece of auxiliary equipment. In general, film requires the first; a print medium, the second; and projected densities, the third. The next decision is whether the densitometer to be used has been calibrated or not. If it has, the operator may proceed directly to use the densitometer as in FIG. 3C (next). If not, the operator keys the program number (22) for densitometer calibration, whereupon DISPLAY #4 (v. FIG. 5A) appears. If the operator should attempt to bypass the calibration procedure altogether, the computer will display an error message, and the densitometer cannot be used until it is has been calibrated.

Figure 5B:
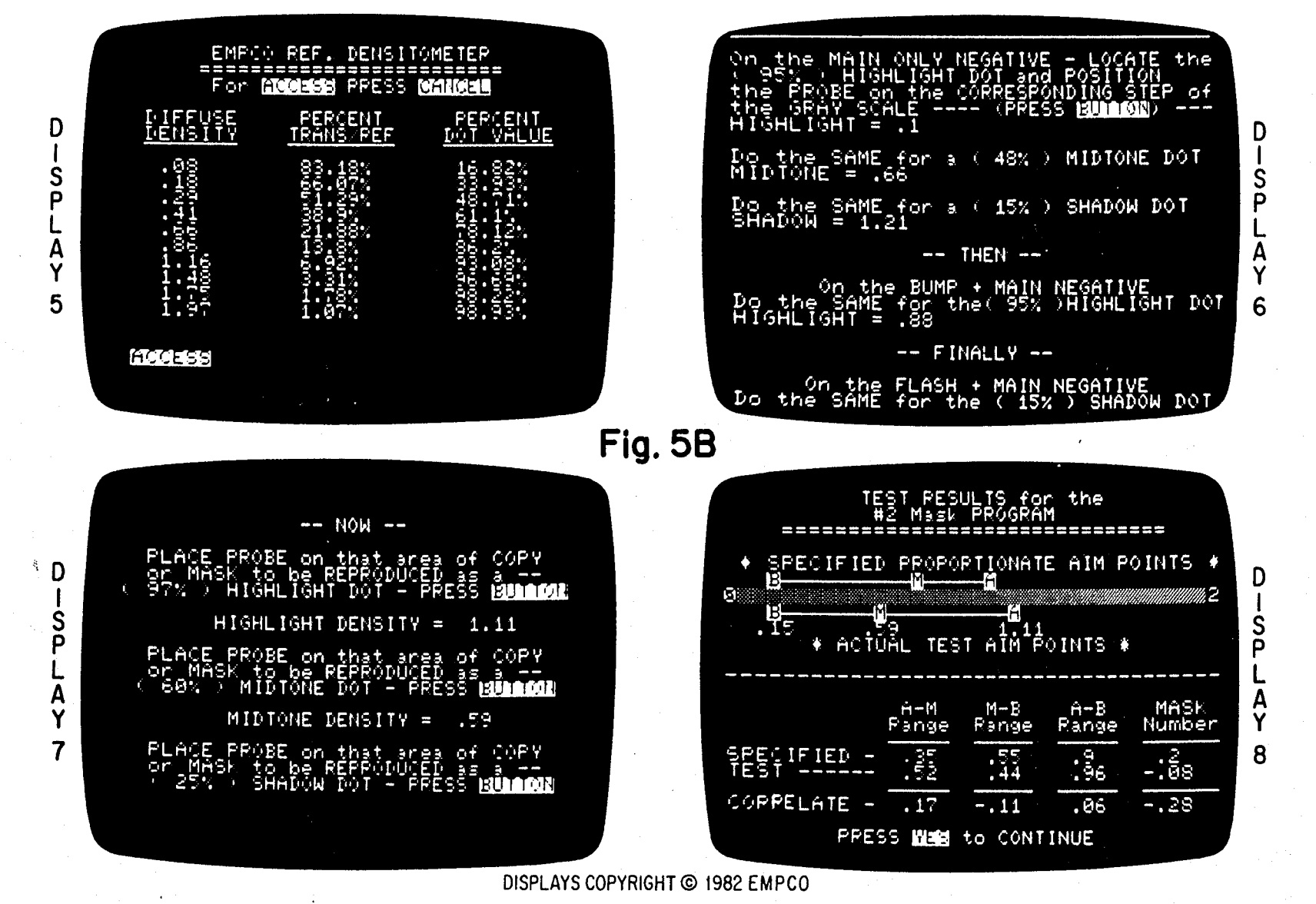

As shown further in FIG. 3B, the operator then enters the specified minimum density of the density standard being used, and then the maximum density of that standard. Both values are stored in the computer memory and appear in the display accordingly. As instructed by the display, the operator then probes (juxtaposes the densitometer probe to) the standard's minimum density area and presses the probe button so as to start the measurement. The density counter in the computer counts incrementally from start to end of a time base (generated by FIG. 1 IC chip 5D, a 555 type) determined by the light flux received, as a numerical measure of the density. This is repeated for the maximum density area of the standard. As the response of the densitometer is essentially linear, it is now calibrated, and the computer can apply the resulting slope and zero intercept to subsequent readings. It calculates and shows in DISPLAY #5 (v. FIG. 5B) the corresponding density, percent transmission or reflection, and percent halftone dot for the measured values.

FIG. 3C shows use of the calibrated densitometer to generate bases and constants for subsequent calculations and programs. The operator follows the left side or the right side of this diagram, depending on whether using a halftone screen or a continuous tone no-screen process. In the halftone procedure, the operator, aided by experience or external instruction, selects and keys in a trial main exposure in number of exposure units. The selected number is displayed so that the operator can see whether it was entered correctly. Next the operator depresses the EXPOSE key, whereupon lamps 120 illuminate the copy, the shutter opens, then the counter counts down the selected number of units, and the shutter closes. Exposure determination by light-integrating flux—instead of time, for example—has been described in my aforementioned patents, and is supplemented and updated by the means of FIG. 2 and description herein. After exposure, the exposed medium is developed, and the resulting photo-reproduction is checked by the operator. If the result is not very close, other trial exposures should be selected and completed until the result is reasonably close. This provides a basic main exposure for further use according to this invention.

With the main base exposure selected, the computer calculates trial bump exposures, and the operator exposes three graduated grey-scale standards (at least 25 steps): one for main exposure, another for main plus bump exposure, and yet another for main plus flash exposure. (Like the main only, the flash is determined by trial.) All three exposed strips are developed in like manner. Then, following instructions given by computer DISPLAY #6, the operator locates and probes desired highlight, midtone, and shadow dot values in the first strip, the desired highlight dot value in the second strip, and desired shadow dot value in the third strip. Corresponding percentage dot values are calculated and stored in the computer, which also calculates related bases and constants for subsequent use. This completes the left half of the FIG. 3C flow chart.

It should be noted that, in color work, once the bases have been so generated for cyan, the computer has adequate data so that main plus bump and main plus flash exposures need not be done for the other colors. Main exposure alone suffices except for cyan.

As shown in the right-hand column in FIG. 3C, the operator proceeds differently in a continuous tone or no-screen procedure. First, the operator enters a trial exposure of the copy to be reproduced, exposes it, enters a trial development time, and then develops it. Following instructions received in DISPLAY #7 (FIG. 5), the operator probes highlight (A), midtone (M), and shadow (B) areas of the resulting reproduction. The computer calculates the tonal ranges: AM, AB, MB, and M# (mask number), both so obtained and as desired, whereupon they all are shown both numerically and graphically in DISPLAY #8 (FIG. 5B) together with the respective discrepancies between goals and results. Using this information, the computer will automatically (at the operator's request) adjust exposure light flux and developer time to enable the operator to obtain the desired density characteristics in photo-reproductions.

FIGS. 3D and 3E are comparable flow charts for color work. It will be understood that the copy is, in effect, subdivided into several color components by photographing it successively through correspondingly distinct color filters, after which each resulting record is itself black and white. To obtain separation negatives of reflection copy, as here, the cyan (blue-green) record results from use of a red filter, magenta (reddish purple) from a green filter, and yellow from a blue filter. However, as printing inks are not true colors but include some unwanted color to a greater or lesser extent, masks for combination with such negatives are prepared to compensate for such ink deficiencies. So-called UCR (under color removal) masking for black reduces all color contributions so as to substitute black ink instead of recombined colors (which usually turn out rather muddy) where black is wanted. The degree to which color correction is undertaken depends upon the desired quality of reproduction as well as upon the nature of the copy and the materials to be used; thus, there are one-mask and various multiple-mask procedures from which selection can be made.

FIG. 3D shows a mask-making loop, which can be followed one or more times, depending upon which masks are to be prepared from the menu of cyan, magenta, yellow, black, and UCR masks. The cyan mask is used here in the displays as an example. The operator, upon keying the desired mask, is presented with a display such as DISPLAY #9 provided with bases and constants generated previously as described in the foregoing diagrams and related description. If the operator wishes to make a tonal correction by a highlight density shift he receives an opportunity to do so (display not shown) by probing the desired highlight area. Next the operator is shown, as in DISPLAY #10, the exposure units and development time calculated by the computer for the pertinent data provided. The operator keys the exposure, which is performed automatically, and then keys development of the exposed film, which is performed without further action by the operator. DISPLAY #11 then shows that they have been done. Next the operator probes the preferred highlight, midtone, and shadow areas of the reproduction and keys the indirect screen program, whereupon the computer provides a display similar to DISPLAY #12 (but with values included). The cyan screen will be prepared subsequently in conventional manner, but in the meantime the operator recycles through the procedural loop for each additional mask to be prepared.

FIG. 3E shows direct-screen processing of colored copy, going directly from the copy to halftone separation negatives without the intermediate step of preparing continuous tone separations. This diagram also is loop-like, enabling the operator to traverse like steps for each screen to be made in any suitable procedure. Decision points are included for cyan, magenta, yellow, and black screens, and cyan will be used as an example in this description.

Upon keying the desired screen program, the operator is shown DISPLAY #13, which resembles the indirect screen program last seen but requires certain filters and different film; here again the data generated or supplied in previous procedures will be used in determining exposure units, development time, etc. The operator is given a choice of 2-aim (highlight and shadow) or 3-aim (high-light, midtone, and shadow) operation. If 3-aim is chosen, the operator is instructed, as in previous DISPLAY #7, to probe the preferred highlight, midtone, and shadow areas and, after doing so, is shown DISPLAY #15—which gives the respective densities. If, on the other hand, the operator prefers to follow the 2-aim procedure instead, DISPLAY #14 instructs him to key in a number indicative of the predominant tone (or "key") of the copy, so as to provid more detail in the reproduction over that range of the copy. The operator also can key in a secondary adjustment for the reflectance of the paper on which the reproduction is to be made. The displayed results of doing so will resemble those in DISPLAY #15 except that no value of midtone density will be presented.

Continuing with the direct-screen (FIG. 3E) program, the operator keys the main exposure and the bump and flash exposures. The operator then keys development of the exposed film and finally probes the reproduction in highlight, midtone and shadow areas. The computer calculates the respective dot-density correlations, and stores the data as it does the results of other calculations. When the entire direct-screen program is completed, the operator is shown DISPLAY #16, which indicates (as percentage error) the degree to which the results correlate with what is desired, for each of the screens—as well as for applicable continuous tone ranges for indirect separations and masks, respectively.

Note that, in the examples, the displayed data may not be consistent throughout any given program. Instead, such data are intended as being exemplary of what may be obtained with diverse, rather than invariant or consistent, conditions and materials. Nor are the displays presented herein exhaustive. Numerous other announcements (such as of errors made), instructions (such as of the next steps to be followed), procedures (see index), and other graphical, numerical, and verbal information (such as a graph of reciprocity failure for a given actinic medium) are available.

FIG. 4 presents schematically the computational flow of data according to which the sometimes simple, sometimes very complex calculations or computations are made in order to enable the desired photo-reproduction quality to be attained. Athough an operator endowed with considerable computational skill conceivably could make a good many of the requisite calculations, others of them could not be completed by unassisted human endeavor within a practical time, and probably not at all by most operators. Thus, machine-assisted computational ability is essential in practicing this invention. Moreover, a machine such as a digital computer is error-free substantially all the time, whereas human calculations can be expected to be too error-ridden to be at all satsifactory.

Table 1 below sets forth EQUATIONS through which the desired intermediate and final outputs in FIG. 4 can be derived in usual mathematical fashion. Of the enumerated 47 equations, over two dozen of them appeared in the aforementioned Archer papers, viz: 1 through 9, 46, 47, 14, 15, 16, 45, 48, 49, 21 through 29. The numbers presented out of order here are found in the second of the Archer papers as improvements upon lower numbered equations in the first Archer paper. The equations numbered from 58 upward are directed to supplementary subject matter and, like those not here attributed to Archer, have been supplied by the present inventor.

Table 2 is a LEGEND of the symbols used in the equations of Table 1, whether as constants, variables, or merely subscripts or superscripts for other of the symbols. A cross-reference of the symbols to the equations in which they appear is included for the convenience of anyone undertaking to follow the mathematics, as is a rather compact rendition of the meaning of each symbol so as to aid such effort further.

It will be understood that, for the computer to solve any one equation or group of equations, the independent variables therein must be provided to the computer, either by the operator (as in the instance of data associated with the operating conditions or with the particular copy to be reproduced), or by photo suppliers (as in the instance of actinic characteristics of photographic film or paper, filter identification, or developer information). Invariant data, as well as statistical and other mathematical equation-solving programs for the computer to follow, may well be stored in its nonvolatile memory (as in a ROM), whereas most of the derived operating data will be handed in RAM memory that need not be kept after completion of an individual job. The computer will solve for the dependent variables in conventional manner if it receives the necessary inputs, or it will give the operator the usual error messages calling for omitted data, as when an operator skips an essential part of program, etc.

Primed versions of variables in the tables differ, as noted at the end of Table 2, from unprimed versions of the same symbols by appropriate correction for reciprocity failure, which in some instances or for some purposes may be negligible or at least left uncorrected. As indicated by Archer, equation no. 8 enables an actual exposure time to be converted into so-called "effective" or corrected (for reciprocity failure) time for the purpose of other calculations—such as changes in exposure time arising from change in copy density, etc.—after which equation no. 9 prescribes the reconversion into actual time. Such conversion and reconversion are required only when it is deemed advisable to compensate or correct for reciprocity failure, as is customary for the finest photo-reproduction.

FIG. 4 contains parenthetical references to the equations by number. The symbols at the tail or input ends of the arrows are independent variables. Where the arrows terminate at an equation number, symbols at the head or output end of continuing arrows are derived by solving the given equation using the input values. Where two or more arrows funnel in to terminate together, two or more independent variables contribute as inputs to the equation, and multiple outputs may stem from two or more combined arrows or combined equations. Where no equation number is juxtaposed, the same variable may be repeated at the arrowhead for clarity, or the arrow may terminate at a physical operation, for example. In general, the many bases, constants, and probed densities or other inputs to generate data combine with various items or stored data to give items of intermediate or final output data. As clearly shown, where the equations ultimately funnel in together at the right side of the diagram, the outputs are few indeed: (a) for halftone screened reproduction, only main exposure, bump exposure, and flash exposure; and (b) for no-screen continuous tone work, only one exposure and development time. The diagram is discussed further following the tables.

TABLE 1
EQUATIONS

| Eq. No. | |
|---|---|
| 1 | $R = 10^{-D}$ |
| 2 | $R' = 10^{-D} + F$ |
| 3 | $E = It$ |
| 4 | $E_c = eIt$ |
| 5 | $\text{Log } e = -a(\text{Log } t - \text{Log } t_o)^2$ |
| 6 | $t' = et$ |
| 7 | $E_c = It'$ |
| 8 | $\text{Log } t' = \text{Log } t - a(\text{Log } t - \text{Log } t_o)^2$ |
| 9 | $\text{Log } t = [a\text{Log } t_o + \frac{1}{2} - (-\frac{1}{4} + a\text{Log } t_o - a\text{Log } t')^{\frac{1}{2}}]/a$ |
| 46 | $U = R'_{M1}/(R'_{H1} - R'_{M1})$ |
| 47 | $V = R'_{S1}/(R'_{H1} - R'_{S1})$ |
| 13 | $M1 = R'_{M1}/R'_{H1}$ |
| 14 | $M2 = R'_{M2}/R'_{H2}$ |
| 15 | $S1 = R'_{S1}/R'_{H1}$ |
| 16 | $S2 = R'_{S2}/R'_{H2}$ |
| 45 | $K = [U(1 - M2) - V(1 - S2)]/(M2 - S2)$ |
| 48 | $P = (1 - A)/(1 - S1 \cdot A)$ |
| 49 | $A = S2(K/V + 1)$ |
| 21 | $Z'_o = Z'_F R'_{S1}/(R'_{S1} - R'_F)$ |
| 22 | $Y'_o = Y'_B R'_B R'_{H1}/(R'_{H1} - R'_B)$ |
| 23 | $X'_o = X'_1 R'_{H1}$ |
| 24 | $Q = 1 - P \cdot S1$ |
| 25 | $W = 10^{(L1-L2)}$ |
| 26 | $G = [(\% \text{ Mag}/100) + 1]^2/4$ |
| 27 | $X'_2 = (KX'_o QWG)/R'_{H2}$ |
| 28 | $Y'_2 = [(1 - K)Y'_o QWG]/R'_{H2}$ |
| 29 | $Z'_2 = PZ'_o W$ |
| 58 | $y = a_0 + a_1 + a_2 x^2$ |
| 59 | $x = \text{Log } t$ |
| 60 | $\text{Log } t_o = a_1/-2a_2$ |
| 61 | $H_C = H_{PO} - H_{PS}$ |
| 62 | $M_C = M_{PO} - M_{PS}$ |
| 63 | $S_C = S_{PO} - S_{PS}$ |
| 64 | $_o X'_o = X'_o H_{PS}/H_{PO}$ |
| 65 | $_o Y'_o = Y'_o H_{PS}/H_{PO}$ |
| 66 | $_o Z'_o = Z'_o S_{PS}/S_{PO}$ |
| 67 | $Y_B = X_1(B_{MX}/100)10^{Fnd}$ |
| 68 | $S_L = \text{Log}(10^{Hid}/10^{Lod})/\text{Log}(N_{Hid}/N_{Lod})$ |
| 69 | $z_o = (N_{Lod})^{SL}/10^{DLod}$ |
| 70 | $D_R = D_C^{SL}/Z_o$ |
| 71 | $E'_2 = E'_o R'_H G$ |
| 72 | $_o E'_o = E'_o \cdot 2^{J1/(MBo-MBs)}$ |
| 73 | $_o T_{DV} = T_{DV} \cdot 2^{J2/(AMo-AMs)}$ |
| 74 | $_o E'_o = E'_o \cdot 2^{J1/(M\#o-ABo+ABs)}$ |
| 75 | $_o T_{DV} = T_{DV} \cdot 2^{J2/(ABo-ABs)}$ |
| 76 | % Mag = 2nd/1st |
| 77 | $\text{lnMag} = (c - c_o)/(c_1 - c_o)$ |

TABLE 2
LEGEND

| Symbol | Equation(s) | Meaning |
|---|---|---|
| a | 5, 8, 9 | Coefficient of $x^2$ in simple parabolic equation |
| $a_o$ | 58 | Constant first term in quadratic expansion |
| $a_1$ | 58, 60 | Coefficient of x in second term of quadratic expansion |
| $a_2$ | 58, 60 | Coefficient of $x^2$ in third term of quadratic expansion |
| A | 48, 49 | Consolidated variable in flash factor (P) equations |
| $AB_o$ | 74, 75 | Obtained highlight-shadow density range (cont. tone) |
| $AB_s$ | 74, 75 | Specified highlight-shadow density range (cont. tone) |
| $AM_o$ | 73 | Obtained highlight-midtone density range (cont. tone) |
| $AM_s$ | 73 | Specified highlight-midtone density range (cont. tone) |
| B | 67 | Bump (no-screen) |
| c | 77 | Count per unit length on dimensional scale time base |
| $c_o$ | 77 | Count at zero length on same time base |
| $c_1$ | 77 | Count at one unit length (e.g., inch) on same time base |

TABLE 2-continued
LEGEND

| Symbol | Equation(s) | Meaning |
|---|---|---|
| D | 1, 2 | Density (optical) |
| $D_C$ | 70 | Densitometer time base count |
| $D_R$ | 70 | Resulting or output density (probed) |
| DV | 73, 75 | Developer (subscript) |
| e | 4, 5, 6 | Efficiency factor in calcns. with reciprocity failure |
| E | 3 | Exposure (illuminance or time) |
| $E_o$ | 71, 72, 74 | Exposure (first or trial) |
| $_oE_o$ | 72, 74 | Exposure (2nd or adjusted) |
| $E_2$ | 71 | Exposure (contin. tone) |
| $E_c$ | 4, 7 | Exposure at critical density |
| F | 2 | Flare (camera aberration) |
| Fnd | 67 | Neutral density filter (subscript) |
| G | 26, 27, 28, 71 | Image brightness at focal plane of camera |
| H | 61, 64, 65 | Highlight control region |
| H1 | 46, 47, 15, 22, 23, 71 | Highlight dot (subscript) from main test exposure |
| H2 | 14, 16, 27, 28 | Highlight dot specified (subscript) |
| $H_C$ | 61 | Closeness of obtained to specified highlight % dot |
| Hid | 68 | High density of calibration standard (also subscript) |
| I | 3, 4, 7 | Illuminance (light flux) |
| J1 | 72, 74 | Empirical exposure constant for given film & developer |
| J2 | 73, 75 | Empirical development const. for given film & developer |
| K | 45, 49, 27, 28 | Control factor (for main and bump exposures) |
| L1 | 25 | Developer activity factor (from test or trial expos.) |
| L2 | 25 | Developer activity factor (at production run) |
| Lod | 68, 69 | Low density of calibration standard (also subscript) |
| Log | 5, 8, 9, 59, 60, 68 | Common (base 10) logarithm |
| M | 62 | Midtone control region |
| M1 | 46, 47, 14 | Midtone dot (subscript) from main test exposure |
| M2 | 14, 45 | Midtone dot specified (subscript) |
| $M\#_o$ | 74 | Mask number range (AM-MB) obtained (contin. tone) |
| $MB_o$ | 72 | Obtained midtone-shadow density range (cont. tone) |
| $MB_s$ | 72 | Specified midtone-shadow density range (cont. tone) |
| $M_C$ | 62 | Closeness of obtained to specified midtone dot |
| MX | 67 | Maximum (subscript) |
| N | 68, 69 | Count on light-controlled time base |
| P | 48, 24, 29 | Flash factor (basic flash) |
| PO | 61, 62, 63, 64, 65, 66 | Percentage dot obtained |
| PS | 61, 62, 63, 64, 65, 66 | Percentage dot specified |
| Q | 24, 27, 28 | Flash compensation factor for main & bump exposure |
| R | 1, 2, 46, 47, 14, 15, 16, 21, 22, 23, 27, 28, 71 | Reflectance (or transmittance) |
| $R'_B$ | 22 | Effective reflectance for specified % dot (main & B) |
| $R'_F$ | 21 | Effective reflectance for specd % dot (main & flash) |
| S | 63, 66 | Shadow control region |
| S1 | 47, 15, 48, 21, 24 | Shadow dot (subscript) from main test exposure |
| S2 | 16, 45, 49 | Shadow dot specified (subscript) |
| $S_C$ | 63 | Closeness of obtained to specified shadow % dot |
| $S_L$ | 68, 69, 70 | Slope in calibration of densitometer |
| t | 3, 4, 5, 6, 7, 8, 9, 59 | Time (exposure) |
| $t_o$ | 5, 8, 9, 60 | Time (at maximum speed) on reciprocity failure curve |
| T | 73, 75 | First or trial exposure time (with DV subscript) |
| $_oT$ | 73, 75 | Adjusted exposure time (with DV subscript) |
| U | 46, 45 | Midscreen range (ratio of reflectances producing specified H to M dots) |
| V | 47, 45, 49 | Full screen range (ratio of reflectances producing specified H to S dots) |
| W | 25, 27, 28, 29, 71 | Developer activity in terms of density shift |
| x | 58, 59 | Abscissa of correction curve for reciprocity failure |
| $X_o$ | 23, 27, 64 | Main exposure (real terms) |
| $_oX_o$ | 64 | Adjusted main exposure |
| $X_1$ | 23, 67 | Main exposure (test or trial) |
| $X_2$ | 27 | Main exposure output (real) |
| y | 58 | Ordinate of correcn curve for reciprocity failure |
| $Y_o$ | 22, 28, 65 | Bump exposure (real terms) |
| $_oY_o$ | 65 | Adjusted bump exposure |
| $Y_2$ | 28 | Bump exposure output (real) |
| $Y_B$ | 22, 67 | Bump exposure (test or trial) |
| $z_o$ | 69, 70 | Ordinate axis intercept in calibration of densitometer |
| $Z_o$ | 21, 29, 66, 69, 70 | Flash exposure (real terms) |
| $_oZ_o$ | 66 | Adjusted flash expos. (real) |
| $Z_2$ | 29 | Flash exposure output (real) |
| $Z_F$ | 21 | Flash expos. (test or trial) |
| 1st | 76 | Copy dimension (original or first) |
| 2nd | 76 | Specified dimension (second or as to be in reproduction) |
| % Mag | 26, 76 | Magnification ratio (in %) |
| lnMag | 77 | Magnification ratio |
| prime (') | 2, 6, 7, 8, 9, 46, 47, 14, 15, 16, 21, 22, 23, 27, 28, 29, 64, 65, 66, 71, 72, 74 | Denotes "effective" values (adjusted to compensate for reciprocity failure) |

More particularly, FIG. 4 shows, in the column at the far left, job input densities, developer activity factors, and scale magnification factors. The next column to the right lists various data-generating inputs, including densitometer calibration, flare controls for physical features, also specified percentage dot sizes for screened—and density ranges for continuous tone—work, and also developer factors and development times, and preliminary exposure data. Offset to the right are resulting densities in various portions of negatives as developed after trial exposures, and related filter and exposure data. The next principal column, headed "Stored Data" is a column including data items, some from the left and others derived by applications of the parenthetically noted equations to input data, such as reciprocity constants, densitometer constants, and calculated base exposures. Offset to the right, in addition to physical controls, are data obtained by a first pass from extreme left to extreme right and being recycled for fine tuning, also calculated exposure data carried over from the last column, and exposure and developer factors. The sparse output data at the far right (exposures for screened operation, and exposure units and developer time for continuous tone), have been mentioned in advance on the tables. Derivation of outputs according to these respective types of procedure is considered in some detail below.

In the first, or halftone, procedure the operator designates desired dot sizes for highlight, midtone, and shadow regions of the reproduction ($H_{PS}$, $M_{PS}$, $S_{PS}$). Then the operator performs a trial main exposure $X_1$, trial bump exposure $Y_B$ (determined via the the operator's neutral density filter from the base exposure and a maximum limitation on bump exposure to limit dot degeneration), and trial flash exposure $Z_F$ of given film. Separate negatives exposed for the main exposure, the main plus bump exposure, and the main plus flash exposure are developed; they then are probed (i.e., their densities measured) in highlight, midtone, and shadow areas (giving $D_{H1}$, $D_{M1}$, and $D_{S1}$) of the main only, the highlight region of the main plus bump (giving $D_B$), and the main plus flash (giving $D_F$) where the desired percentage dot sizes were produced. Application of equation no. 2 to the exposures and of equation no. 8 to the probed densities of the resulting negatives then gives corresponding effective exposures and reflectances, as indicated by the respective horizontal arrows in FIG. 4. Other arrows (some of them oblique) indicate combinations that produce effective base exposures and determine density ranges of the screen used: thus, $X_1'$ and $R_{H1}'$ give effective base main exposure $X_o'$ via equation no. 23; $Y_B'$, and $R_{H1}'$, and $R_B'$ effective base bump exposure $Y_o'$ via equation no. 22; $Z_F'$, $R_{S1}'$, and $R_F'$ effective base flash exposure $Z_o'$ via equation No. 21.

Probed densities of copy regions in which the operator wants to produce the specified dots give effective reflectances and thereupon $R_{H2}'$ and $R_{M2}'$ provide the required copy midscreen range M2 via equation 14, and $R_{M2}'$ and $R_{S2}'$ give the required full screen range S2 via equation 16. Intermediate variables U and V, which are measures of screen midtone and full range, respectively, are given by equations 46 and 47. U and V are combined with M2 and S2 via equation 45 to provide exposure factor K. Compound variable A formed from K, S2, and V via equation no. 49 is combined with S1 via equation no. 48 to give further factor P. Factor Q is formed from P and V via equation no. 24. Developer activity factor W and magnification factor G, obtained empirically as indicated, are utilized along with factors K, P, and Q plus the effective exposures and highlight reflectance as shown via equations no. 27, 28, and 29 to provide the effective main, bump, and flash exposure values—reconvertible then to actual exposures by equation no. 9. Comparison of percentage dots obtained in a reproduction so made against the specified percentage dots via equation 19 enables the stored effective base exposures to be adjusted automatically in a direction to produce better agreement between the specified sizes of dots and the dot sizes obtained in a subsequent reproduction.

In continuous tone work, on the other hand, the density $D_H$ of a preferred highlight area of the copy to be reproduced is probed and is converted to effective reflectance $R_H'$ by equation no. 2. The operator selects a trial exposure $E_1$, which is converted to an effective exposure $E_o'$ by equation no. 8. Combination of these two values with one another and with magnification factor G gives the actual exposure $E_2$ (after conversion from an effective value). The operator exposes standard copy, such as a multi-step grey scale, for such number of exposure units and then develops the resulting negative for a selected development time. The operator then compares the density values resulting in the desired regions (highlight, midtone, and shadow) thereof against the desired or preferred density ranges previously specified by the operator: AM and MB for continuous tone separations, AB and M#(=MB−AM) for color correction masks. Appropriate adjustment of exposure units and development time (by equations no. 72 and 73 for the separations, and equations no. 74 and 75 for the masks) enables non-standard copy to be reproduced likewise with density ranges matching the specified ranges within an acceptable tolerance.

Figure 5C:
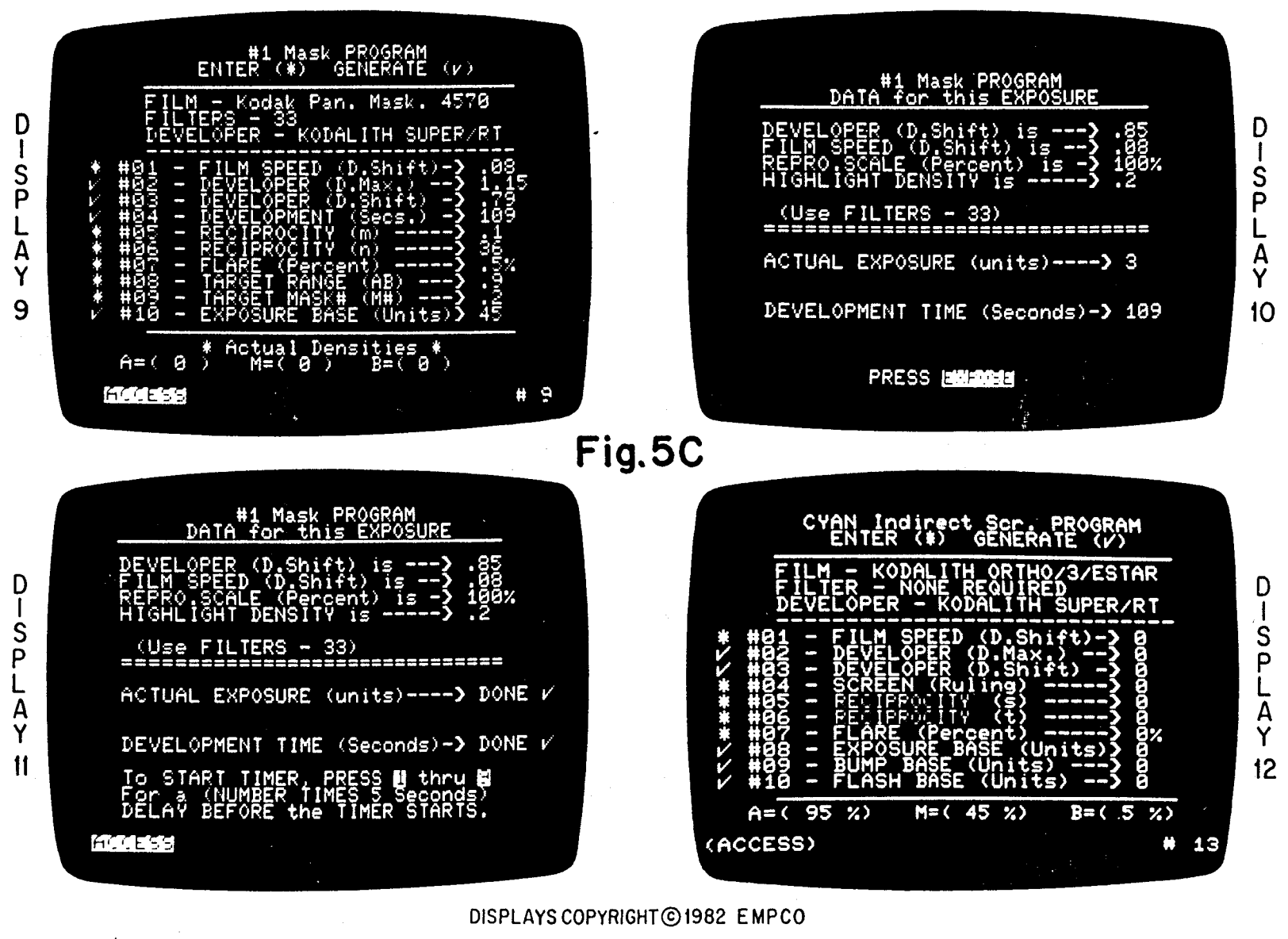
Figure 5D:
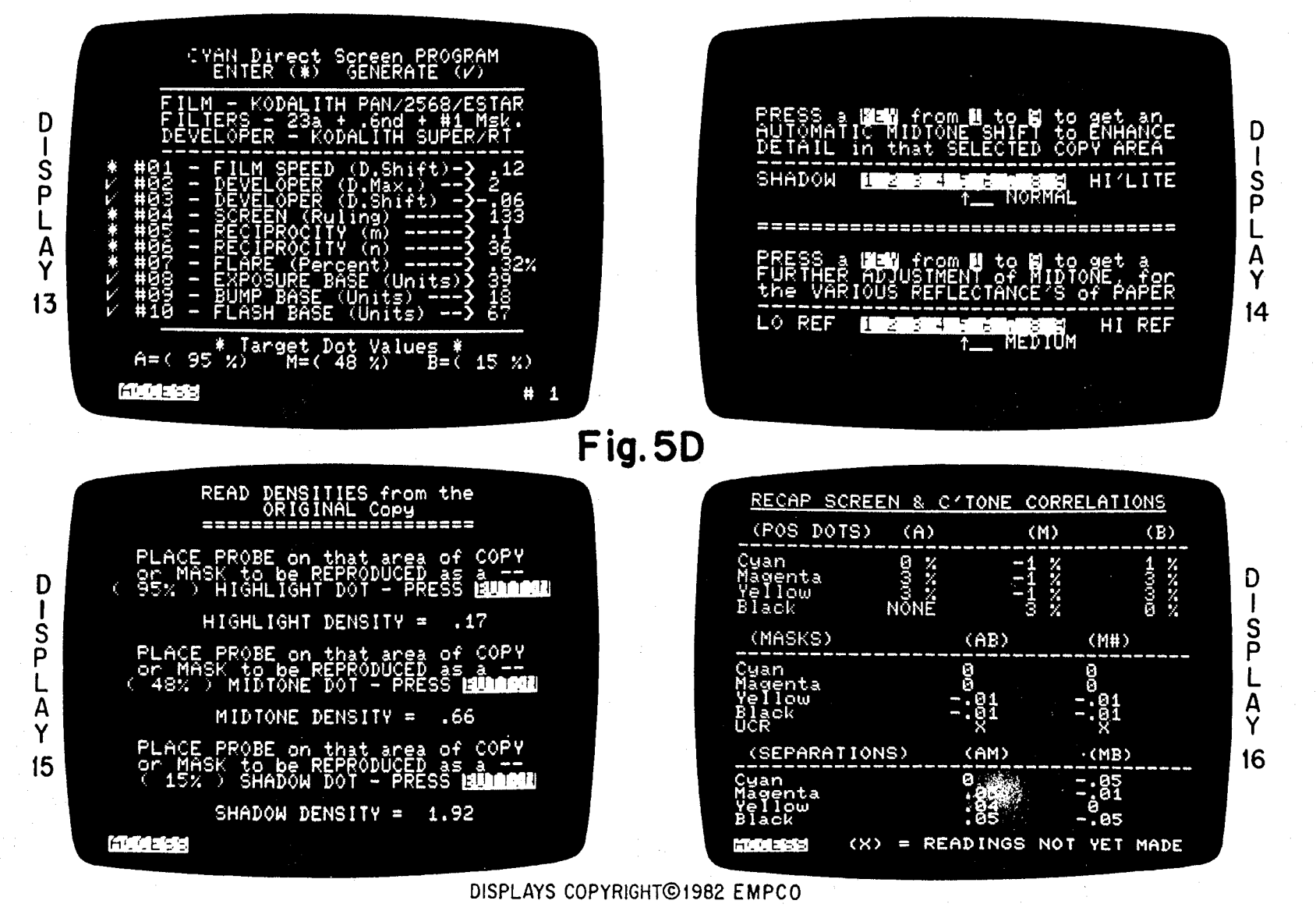

Application of the procedures of FIG. 4 to color work as well as black and white will be understood by persons ordinarily skilled in the art of photo-reproduction in the light of the foregoing description and the contents of FIGS. 3D and 3E and of FIGS. 5C and 5D especially.

Although a preferred embodiment of the present invention has been shown and described, modifications to like efect may be made, as by replacing the programmed cassette tape by other memory means such as floppy or rigid storage disks, ROM (read-only memory), or non-volatile RAM (random access memory). Several methods of color photo-reproduction have been described whereby the invention may be practiced, by way of color-correcting masks, and both indirect-screen and direct-screen color-correction negatives, for example. Other modifications may be made, as by adding, combining, deleting or dividing parts of steps, while retaining many of the advantages and benefits of this invention, which itself is defined only in the following claims.

The claimed invention is:

1. In a stepwise procedural light-integrating system of photographic exposure control, wherein a human operator causes densitometric data to be supplied to apparatus adapted to store retrievably and to process such data for quality photo-reproduction of copy in color, the improvement comprising making color-correction masks for respective colors to compensate for color-impurity of correspondingly colored inks, including densitometrically probing highlight, midtone, and shadow regions of a mask negative developed for a trial time after having been exposed for a trial number of light units, for subsequent superimposition with a corresponding color-separation negative of the copy to be reproduced prepared by photographing such copy through a filter of complementary color.

2. Photographic exposure system according to claim 1, wherein such masks are so made for the colors: cyan, magenta, and yellow.

3. Photographic exposure system according to claim 1, wherein the individualized exposures of the respective masks are adjusted by the operator to expand the density range of the copy's predominant tone, including densitometrically probing a corresponding region of the copy, and adjusting the exposure units and development times accordingly.

4. Photographic exposure system according to claim 2, wherein to make each of the desired masks the operator is instructed by displays presented to the operator by the apparatus.

5. In a stepwise procedural light-integrating system of photographic exposure control, wherein a human operator causes densitometric data to be supplied to apparatus adapted to store retrievably and to process such data for quality photo-reproduction of copy, the improvement comprising making direct-screen color separation negatives, including densitometrically probing preferred highlight and shadow regions of the copy, then making main, bump, and flash exposures and developing each resulting negative, next densitometrically probing each resulting negative in highlight and shadow regions, then comparing via the apparatus resulting regional dot sizes against corresponding preferred dot values previously stored.

6. Photographic exposure system according to claim 5, wherein the operator also probes a preferred midtone region of the copy, and the result of doing so is taken into account via the apparatus in determining the exposures.

7. Photographic exposure system according to claim 5, wherein the operator also keys into the apparatus a numerical index of the prevailing copy tone, and such index is taken into account via the apparatus in determining the exposures.

8. Photographic exposure system according to claim 5, wherein the operator also keys into the apparatus a numerical index of the reflectance of the reproduction medium, and such index is taken into account via the apparatus in determining the exposures.

9. Photographic exposure system according to claim 5, wherein standard grey scales are exposed earlier by the operator, one each for main exposure, for main plus "bump" (no-screen) exposure, and for main plus flash (screened, no-copy) exposure for a cyan separation negative; and one for main exposure only for each other color negative; and after developing the resultant test strips the operator locates on the developed strips the desired percentage dots in the highlight, midtone, and shadow regions of the main only strips, the desired dot size in the highlight region of the main plus bump strip, and the desired dot size in the shadow region of the main plus flash strip, and densitometrically probes them individually and thereby supplies their respective density data to the apparatus.

10. Color photo-reproduction apparatus, adapted by means of a camera and color filters to convert copy to be reproduced into a set of color separations characteristic of the copy colors, comprising operatively interconnected densitometric means for measuring optical densities of the copy to be reproduced and of resulting reproductions thereof, and computing apparatus including means adapted for retrievably storing data and including means for processing data to solve mathematical equations in which the data comprise values of the independent variables therein, and the resulting values of the dependent variables therein comprise the exposures in light units.

11. In a stepwise procedural system of photographic exposure control, wherein a human operator causes densitometric data to be supplied to apparatus adapted to store retrievably and to process related data about the photographic characteristics of diverse media to be exposed, the improvement comprising so supplying and retrievably storing such data to be processed for nonstandard copy to be reproduced in color, including densitometric data for desired highlight and shadow regions of non-standard copy to be reproduced photographically, exposing such copy through a color filter, and developing a color separation negative therefrom.

12. Photographic exposure system according to claim 11, wherein desired highlight, midtone, and shadow densities are supplied by the operator to and stored by the apparatus, as are the results of the operator's densitometric probing of corresponding steps on a standard grey scale.

13. Photographic exposure system according to claim 11, wherein continuous-tone no-screen reproduction is being performed, and including the steps of measuring and storing retrievably the density and corresponding light transmission or reflection of the desired regions of the copy, making a test exposure thereof for a trial number of light units and developing it for a trial number of seconds, measuring the density obtained and calculating the light transmission or reflection in resulting desired locations, and comparing the obtained and desired tonal ranges thereof.

14. Photographic exposure system according to claim 11, including, if the operator wishes to make a highlight tonal shift, the step of densitometrically probing the highlight portion of the copy and storing the resulting density before exposing the copy.

15. Photographic exposure system according to claim 11, including the steps of displaying to the operator via the machine instructions for densitometric probing of the highlight, midtone, and shadow portions of the developed negative and displaying the obtained tonal ranges and departures from the desired values.

16. Photographic exposure system according to claim 11, including the additional procedure of preparing a color-correction mask for use with such negative to correct for variation between a desired color and an actual ink color.

17. Photographic exposure system according to claim 11, wherein halftone screened reproduction is being performed, and including the steps of making a test "main" (screened) exposure of the copy for a trial number of light units, making a second test exposure the same as the first test plus a "bump" (no-screen) exposure of the copy for a prescribed number of light units, and making a third test exposure the same as the first plus a "flash" (screened, no-copy) exposure for a trial number of light units, developing the three exposed test strips, locating desired the highlight, midtone, and shadow dot values in resulting portions of the first strip, the desired highlight value in the second strip, and the desired shadow value in the third strip, measuring the corresponding densities, and calculating basic main, bump, and flash exposures with the aid thereof.

18. Photographic exposure system according to claim 17, wherein a cyan color separation negative is so made.

19. Photographic exposure system according to claim 18, wherein magenta and yellow color separation negatives are also so made except that only a main exposure is required for each of these additional color negatives.

20. Photographic exposure system according to claim 17, including the steps of displaying to the operator via the machine instructions for densitometric probing of the highlight, midtone, and shadow portions of the developed negative and calculating via the machine values of bases for future reference and exposure use.

21. Photographic exposure system according to claim 17, including the additional procedure of preparing a color-correction mask for use with such negative to correct for variation between a desired color and an actual ink color.

22. Color photo-reproduction apparatus according to claim 21, wherein the memory means has stored therein the first twenty-seven listed equations from Table 1 comprised of symbols having the meanings thereof in Table 2.

23. Color photo-reproduction apparatus according to claim 22, wherein the stored equations comprise also the last twenty of those listed in Table 1.

24. Color photo-reproduction apparatus according to claim 21, wherein the data processing means is further adapted to compare values of optical density data obtained in a photo-reproduction against desired values of such density data, and also adapted to adjust exposures to bring the observed values of such data closer to the desired values.

25. Color photo-reproduction apparatus according to claim 10, wherein the memory means has stored therein the following equations (Table 1) wherein the symbols have the meanings in the following legend (Table 2):

TABLE 1
EQUATIONS

| Eq. No. | |
|---|---|
| 1 | $R = 10^{-D}$ |
| 2 | $R' = 10^{-D} + F$ |
| 3 | $E = It$ |
| 4 | $E_c = eIt$ |
| 5 | $\text{Log } e = -a(\text{Log } t - \text{Log } t_o)^2$ |
| 6 | $t' = et$ |
| 7 | $E_c = eIt'$ |
| 8 | $\text{Log } t' = \text{Log } t - a(\text{Log } t - \text{Log } t_o)^2$ |
| 9 | $\text{Log } t = [a\text{Log } t_o + \frac{1}{2} - (-\frac{1}{4} + a\text{Log } t_o - a\text{Log } t')^{\frac{1}{2}}]/a$ |
| 46 | $U = R'_{M1}/(R'_{H1} - R'_{M1})$ |
| 47 | $V = R'_{S1}/(R'_{H1} - R'_{S1})$ |
| 13 | $M1 = R'_{M1}/R'_{H1}$ |
| 14 | $M2 = R'_{M2}/R'_{H2}$ |
| 15 | $S1 = R'_{S1}/R'_{H1}$ |
| 16 | $S2 = R'_{S2}/R'_{H2}$ |
| 45 | $K = [U(1 - M2) - V(1 - S2)]/(M2 - S2)$ |
| 48 | $P = (1 - A)/(1 - S1 \cdot A)$ |
| 49 | $A = S2(K/V + 1)$ |
| 21 | $Z'_o = Z'_F R'_{S1}/(R'_{S1} - R'_F)$ |
| 22 | $Y'_o = Y'_B R'_B R'_{H1}/(R'_{H1} - R'_B)$ |
| 23 | $X'_o = X'_1 R'_{H1}$ |
| 24 | $Q = 1 - P \cdot S1$ |
| 25 | $W = 10^{(L1-L2)}$ |
| 26 | $G = [(\% \text{Mag}/100) + 1]^2/4$ |
| 27 | $X'_2 = (KX'_o QWG)/R'_{H2}$ |
| 28 | $Y'_2 = [(1 - K)Y'_o QWG]/R'_{H2}$ |
| 29 | $Z'_2 = PZ'_o W$ |
| 58 | $y = a_o + a_1 + a_2 x^2$ |
| 59 | $x = \text{Log } t$ |
| 60 | $\text{Log } t_o = a_1/-2a_2$ |
| 61 | $H_C = H_{PO} - H_{PS}$ |
| 62 | $M_C = M_{PO} - M_{PS}$ |
| 63 | $S_C = S_{PO} - S_{PS}$ |
| 64 | $_oX'_o = X'_o H_{PS}/H_{PO}$ |
| 65 | $_oY'_o = Y'_o H_{PS}/H_{PO}$ |
| 66 | $_oZ'_o = Z'_o S_{PS}/S_{PO}$ |
| 67 | $Y_B = X_1(B_{MX}/100)10^{Fnd}$ |
| 68 | $S_L = \text{Log}(10^{Hid}/10^{Lod})/\text{Log}(N_{Hid}/N_{Lod})$ |
| 69 | $z_o = (N_{Lod})^{SL}/10^{DLod}$ |
| 70 | $D_R = D_C^{SL}/Z_o$ |
| 71 | $E'_2 = E'_o R'_H G$ |
| 72 | $_oE'_o = E'_o \cdot 2^{J1/(MBo-MBs)}$ |
| 73 | $_oT_{DV} = T_{DV} \cdot 2^{J2/(AMo-AMs)}$ |
| 74 | $_oE'_o = E'_o \cdot 2^{J1/(M\#o-ABo+ABs)}$ |
| 75 | $_oT_{DV} = T_{DV} \cdot 2^{J2/(ABo-ABs)}$ |
| 76 | $\% \text{Mag} = \text{2nd/1st}$ |
| 77 | $\text{InMag} = (c - c_o)/(c_1 - c_o)$ |

TABLE 2
LEGEND

| Symbol | In Eq(s). | Meaning |
|---|---|---|
| a | 5, 8, 9 | Coefficient of $x^2$ in simple parabolic equation |
| $a_o$ | 58 | Constant first term in quadratic expansion |
| $a_1$ | 58, 60 | Coeff. of x in second term of quadratic expansion |
| $a_2$ | 58, 60 | Coeff. of $x^2$ in third term of quadratic expansion |
| A | 48, 49 | Consolidated variable in flash factor (P) equation |
| $AB_o$ | 74, 75 | Obtained highlight-shadow density range (cont. tone) |
| $AB_s$ | 74, 75 | Spec'd highlight-shadow density range (cont. tone) |
| B | 67 | Bump (no-screen) |
| c | 77 | Count per unit length on dimensional scale time base |
| $c_o$ | 77 | Count at zero length on same time base |
| $c_1$ | 77 | Count at one unit length (e.g., one inch) on same |
| D | 1, 2 | Density (optical) |
| $D_C$ | 70 | Densitometer time base count |
| $D_R$ | 70 | Resulting or output density (probed) |
| DV | 73, 75 | Developer (subscript) |
| e | 4, 5, 6 | Efficiency factor in calcns with reciprocity failure |
| E | 3 | Exposure (illuminance or time) |
| $E_o$ | 71, 72, 74 | Exposure (first or trial) |
| $_oE_o$ | 72, 74 | Exposure (second or adjusted) |
| $E_c$ | 4, 7 | Exposure at critical density |
| F | 2 | Flare adjustment factor |
| Fnd | 67 | Neutral density filter (subscript) |
| G | 26–28, 71 | Image brightness at focal plane of camera |
| H | 61, 64, 65 | Highlight control region |
| H1 | 46, 47, 22, 23, 71 | Highlight dot (subscript) from main test exposure |
| H2 | 14, 16, 27, 28 | Highlight dot specified (subscript) |
| $H_C$ | 61 | Closeness of obtained-to-specified highlight % dot |
| Hid | 68 | High density of calibrn. standard (also subscript) |
| I | 3, 4, 7 | Illuminance (light flux) |
| J1 | 72, 74 | Empirical expos. const. for given film and developer |
| J2 | 73, 75 | Empirical devpmt const. for given film and developer |
| K | 45–49, 27, 28 | Control factor (for main and bump exposures) |
| L1 | 25 | Developer activity factor (test or trial exposure) |
| L2 | 25 | Developer activity factor (at production run) |
| Lod | 68,69 | Low density of calibration standard (also subscript) |
| Log | 5, 8, 9, 59, 60–68 | Common (base 10) logarithm |
| M | 62 | Midtone control region |
| M1 | 46, 47, 14 | Midtone dot (subscript) from main test exposure |
| M2 | 14, 45 | Midtone dot specified (subscript) |
| $M\#_o$ | 74 | Mask number range (AM-MB) obtained (continuous tone) |
| $MB_o$ | 72 | Obtained midtone-shadow density range (cont. tone) |
| $MB_s$ | 72 | Specified midtone-shadow density range (cont. tone) |
| $M_C$ | 62 | Closeness of obtained-to-specified midtone dot |
| MX | 67 | Maximum (subscript) |
| N | 68, 69 | Count on light-controlled time base |
| P | 48, 24, 29 | Flash factor (basic flash) |
| PO | 61–66 | Percentage dot obtained |
| PS | 61–66 | Percentage dot specified |
| Q | 24, 27, 28 | Flash compensation factor for main and bump expos. |
| R | 1-2, 45–47, 16, 21–23, 27, 28, 71 | Actual reflectance (or transmittance) |

TABLE 2-continued

LEGEND

| Symbol | In Eq(s). | Meaning |
|---|---|---|
| $R'_B$ | 22 | Eff. reflectance for specified % dot (main & bump) |
| $R'_F$ | 21 | Eff. reflectance for specified % dot (main & flash) |
| S | 63, 66 | Shadow control region |
| S1 | 47, 15, 48, 21, 24 | Shadow dot (subscript) from main test exposure |
| S2 | 16, 45, 49 | Shadow dot specified (subscript) |
| $S_C$ | 63 | Closeness of obtained-to-specified shadow % dot |
| $S_L$ | 68, 69, 70 | Slope in calibration curve of densitometer |
| t | 3–9, 59 | Time (exposure) |
| $t_o$ | 5, 8, 9, 60 | Time (at max. speed) on reciprocity failure curve |
| T | 73, 75 | First or trial exposure time (with DV subscript) |
| $_oT$ | 73, 75 | Adjusted exposure time (with DV subscript) |
| U | 46, 45 | Midscreen range (refl. ratio for spec'd H to M dots) |
| V | 47, 45, 49 | Full scr. range (refl. ratio for spec'd H to S dots) |
| W | 25, 27–29, 71 | Developer activity in terms of density shift |
| x | 58, 59 | Abscissa of correction curve for reciprocity failure |
| $X_o$ | 23, 27, 64 | Main exposure (real terms) |
| $_oX_o$ | 64 | Adjusted main exposure |
| $X_1$ | 23, 67 | Main exposure (test or trial) |
| $X_2$ | 27 | Main exposure output (real) |
| Y | 58 | Ordinate of correction curve for reciprocity failure |
| $Y_o$ | 22, 28, 65 | Bump exposure (real terms) |
| $_oY_o$ | 65 | Adjusted bump exposure |
| $Y_2$ | 28 | Bump exposure output (real) |
| $Y_B$ | 22, 67 | Bump exposure (test or trial) |
| $z_o$ | 69, 70 | Ordinate axis intercept of densitometer cal. curve |
| $Z_o$ | 21, 29, 66, 69, 70 | Flash exposure (real terms) |
| $_oZ_o$ | 29 | Adjusted flash exposure (real) |
| $Z_2$ | 29 | Flash exposure output (real) |
| $Z_F$ | 21 | Flash exposure (test or trial) |
| 1st | 76 | Copy dimension (original or first) |
| 2nd | 76 | Spec'd dimension (second, or as to be in reprodn.) |
| % Mag | 26, 76 | Magnification ratio (in %) |
| InMag | 77 | Magnification ratio |
| prime ['] | 2, 6, 7–9, 46, 47, 14–16, 21–23, 27–29, 64–66, 71, 72, 74 | Denotes "effective" values adjusted to compensate for reciprocity failure - as distinguised from "real" values |

\* \* \* \* \*